June 11, 1940.　　　　　W. P. BERRY　　　　　2,203,810
STEERING SYSTEM FOR AUTOMOBILES
Filed June 26, 1939　　　　4 Sheets-Sheet 1

INVENTOR.
Wilbert Paul Berry
BY Henry Hamilton
ATTORNEYS

June 11, 1940.　　　　　W. P. BERRY　　　　　2,203,810
STEERING SYSTEM FOR AUTOMOBILES
Filed June 26, 1939　　　　4 Sheets-Sheet 3

INVENTOR.
Wilbert Paul Berry
BY
ATTORNEYS

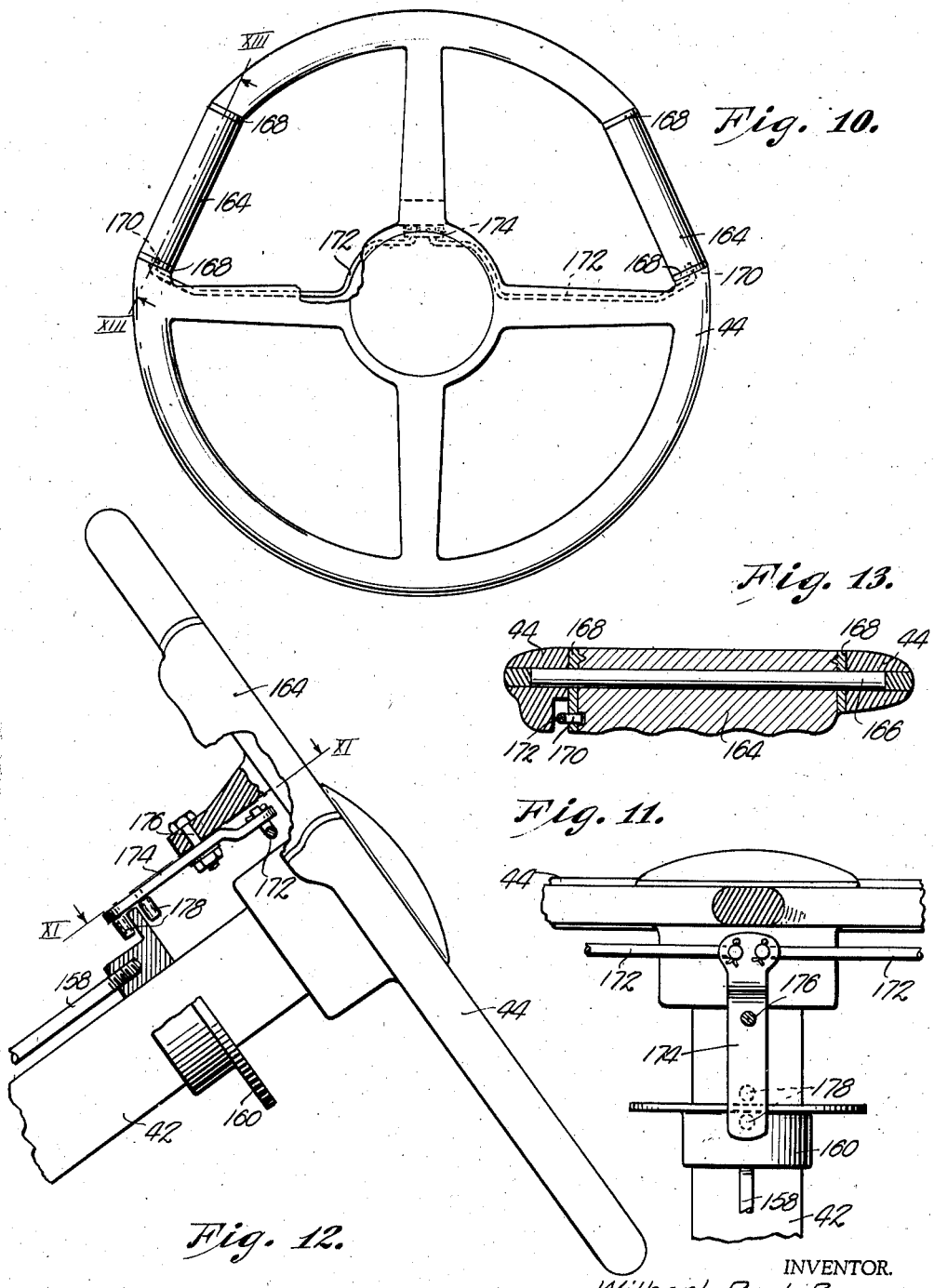

Patented June 11, 1940

2,203,810

UNITED STATES PATENT OFFICE 2,203,810

STEERING SYSTEM FOR AUTOMOBILES

Wilbert Paul Berry, Kansas City, Kans.

Application June 26, 1939, Serial No. 281,171

5 Claims. (Cl. 280—91)

This invention relates to steering mechanism for vehicles and particularly automobiles wherein is incorporated a pair of drive wheels and a pair of wheels that normally constitute means for guiding the vehicle.

The primary object of this invention is to provide steering mechanism for vehicles that will simultaneously rotate each of a number of wheels about their axes in directions selectively controllable by the operator so that the wheels of each pair may be turned about their axes in opposite or same directions.

A further object of this invention is to provide steering mechanism for automobiles having means for normally turning the front and rear wheels about vertical axes in the same direction whereby the automobile may be moved from side to side without changing its heading.

This invention has for a further aim the provision of means for rotatably mounting the driven wheels of an automobile; means for connecting the said driven wheels to the conventional steering gear of the front wheels, and the steering post of the automobile; and means, controllable by the operator for selectively rotating the said driven wheels about their axes in a clockwise or counterclockwise direction.

It is the purpose of this invention to provide an unique steering power transmission that serves as means for interconnecting the conventional steering post and steering wheel to structure operably joined to the vehicle wheels, which transmission comprises manually operable elements for selectively causing the driven wheels of the vehicle to rotate about their axes in either the same direction as the remaining wheels of the vehicle, as the steering wheel is turned, or in a direction opposite to the said direction of rotation of the remaining wheels.

Minor objects of the invention including specific details of construction and manner of embodying the concepts of the invention in automobile steering mechanism will appear during the course of the following specification, referring to the accompanying drawings wherein:

Fig. 8 is an irregular section through the transmission taken on line VIII—VIII of Fig. 6.

Fig. 9 is a fragmentary detailed sectional view taken on line IX—IX of Fig. 5.

Fig. 10 is a plan view of the steering wheel made to embody a portion of the structure for selectively setting the transmission.

Fig. 11 is a detailed sectional view taken on line XI—XI of Fig. 12, looking in the direction of the arrow.

Fig. 12 is an enlarged side elevational view of the steering wheel showing the parts associated therewith for controlling the transmission; and, Fig. 13 is an enlarged fragmentary sectional view taken on line XIII—XIII of Fig. 10.

Figure 1:
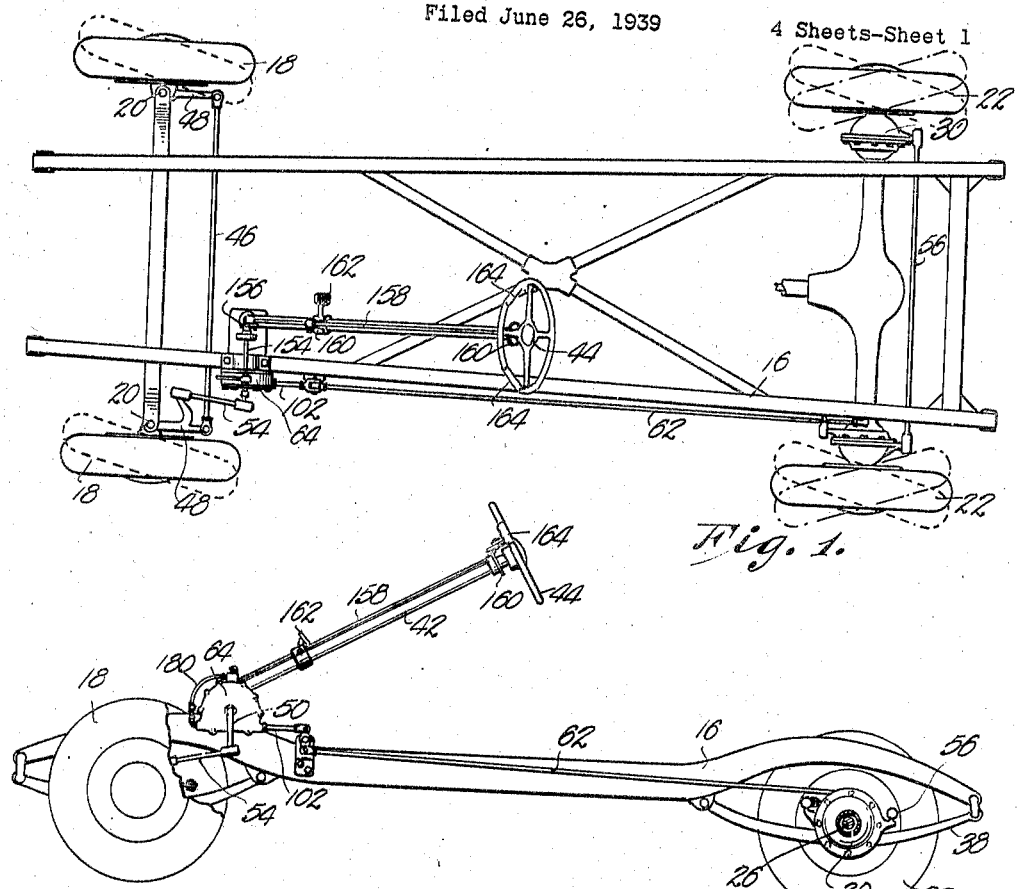
Figure 1 is a top plan view of an automobile chassis having steering mechanism made in accordance with the present invention.
Figure 2:
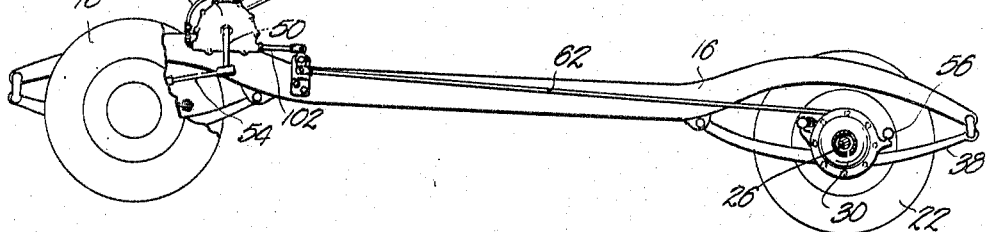
Fig. 2 is a side elevation of the automobile frame and steering mechanism, shown in Fig. 1.

A steering gear for automobiles which fulfills the aforesaid objects, and that is made as illustrated in the drawings, will permit the driver of the vehicle to turn in a limited space and to manipulate the wheels of the automobile so that it may be moved to and from small spaces with a minimum amount of effort.

The illustrated embodiment of the invention has been shown combined with an automobile of conventional type that comprises a frame 16 carried by a pair of front wheels 18, each pivotally mounted as at 20 for rotation about a vertical axis. Rear or driven wheels 22 mounted at the ends of axle 24, are likewise specially mounted for movement about a vertical axis.

Figure 3:
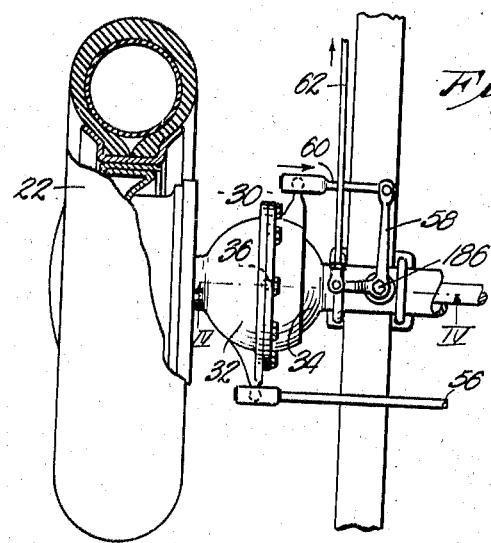
Fig. 3 is an enlarged fragmentary detailed sectional view of one of the driven wheels of the automobile, showing the manner of rotatably mounting the same about a vertical axis.
Figure 4:
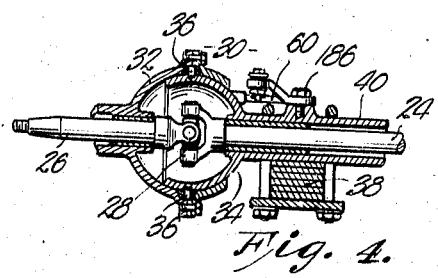
Fig. 4 is a detailed fragmentary sectional view taken on line IV—IV of Fig. 3.

The manner of so supporting wheels 22 is shown in Figs. 3 and 4.

Axle 24 comprises a spindle 26 attached to the main body of axle 24 by a universal joint 28, housed within a spherical case 30, the sections 32 and 34 of which are pivotally joined by pins 36 in alignment with the vertical axis of universal joint 28. Section 32 of case 30 is in two parts as shown in Fig. 4 so that said section 32 may adequately embrace the outer spherical surface of section 34.

Conventional springs 38 interconnect frame 16 with axle housing 40 in the usual way.

Steering column 42, having a specially built steering wheel 44 at the upper end thereof, is manually manipulated to turn wheels 18 and 22.

Front wheels 18 have the usual tie-rod 46 joined to wheels 18 through the medium of arms 48, one of which is attached to arm 50 connected to shaft 52 that is rotated about its longitudinal axis when wheel 44 is actuated by the driver. A link 54 serves as a medium of connection between the free end of arm 50 and the outer end of arm 48.

Rear wheels 22 are provided with a tie-rod 56 which interconnects sections 32 of cases 30 so that both of said sections will simultaneously move about their respective axes as steering force is applied to one of sections 32 through the medium of bell-crank lever 58, link 60 and rod 62. This last mentioned rod extends forwardly to join the steering power transmission 64 located near the base of steering column 42.

Transmission 64 carried by frame 16 has a housing 66 wherein is journalled shaft 52 and which is kept filled with lubricating oil that may be introduced through opening 68, normally closed by plug 70. Shaft 52 extends through housing 66 and has a driving gear 72 splined or otherwise keyed thereon as at 74. Thus, whenever shaft 52 is rotated, driving gear 72 will move therewith.

Figure 7:
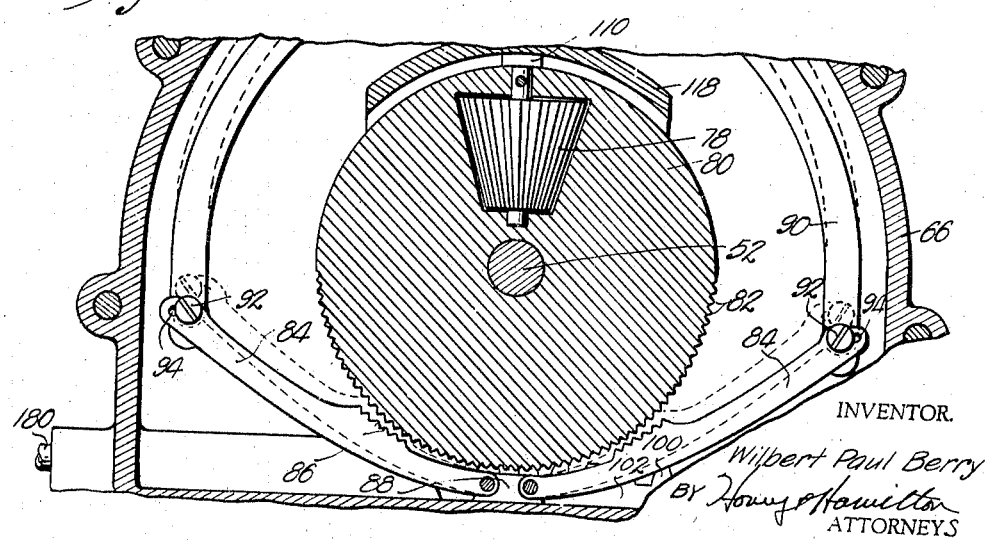
Fig. 7 is a fragmentary sectional view taken on line VII—VII of Fig. 5.

A series of teeth 76 is formed on the inner face of gear 72, which are constantly in mesh with pinion 78 carried by disk 80 mounted for free rotation upon shaft 52. Disk 80 has teeth 82 formed on the annular periphery thereof for engagement by jaws 84, which are supported for movement toward and from a released position, shown in Fig. 7. Teeth 86 on jaws 84 engage teeth 82 of disk 80 as will be more fully hereinafter set forth.

The adjacent ends of jaws 84 are pivotally mounted on an ear 88 integral with housing 66. The free ends of jaws 84 are pivotally secured to yoke 90 through the medium of screws or analogous means 92. Slots 94 permit proper freedom of movement when yoke 90 is actuated.

Figure 5:
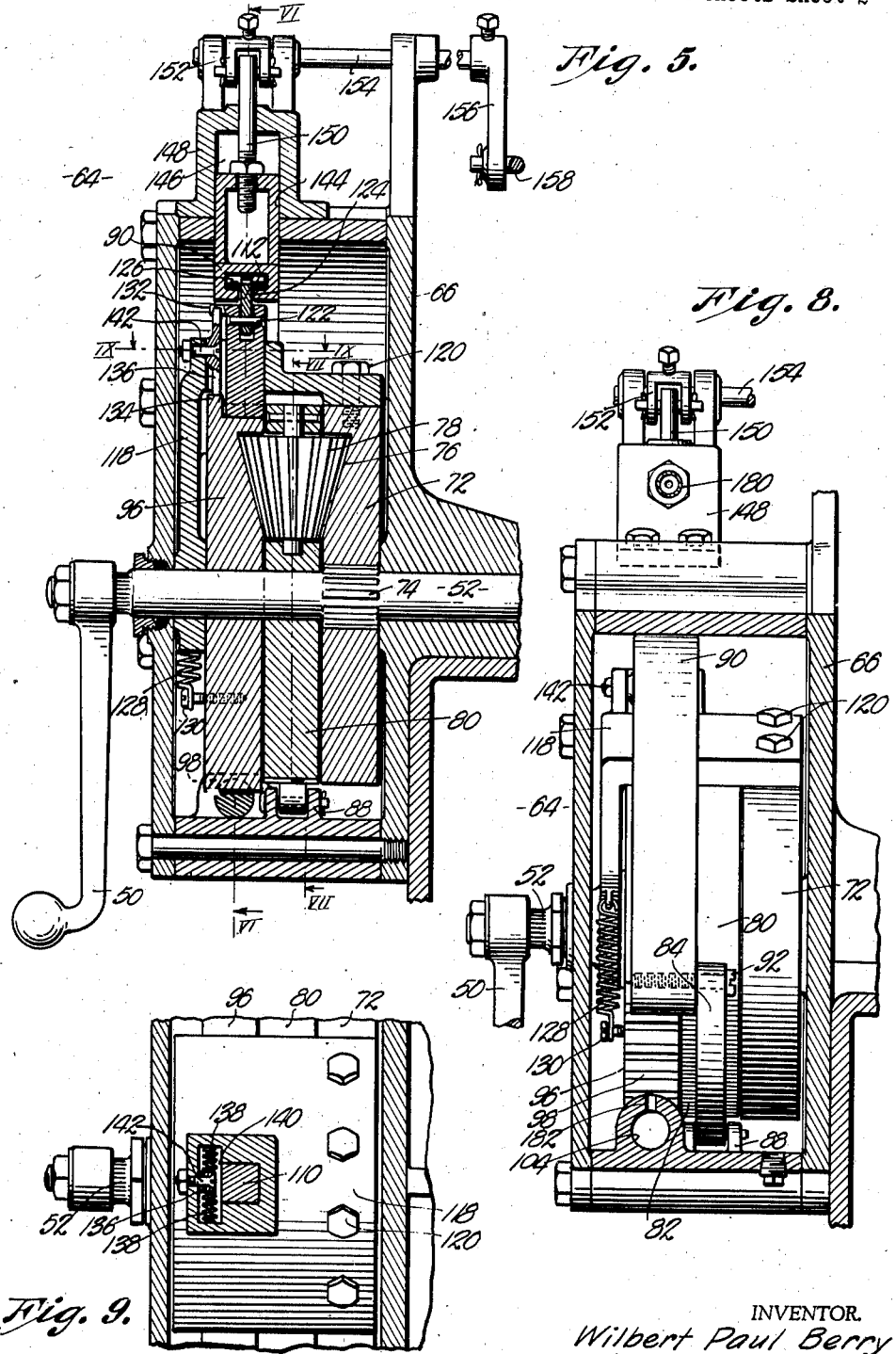
Fig. 5 is a vertical sectional view through the steering power transmission, taken on line V—V of the hereinafter Fig. 6.

A driven gear 96 mounted on shaft 52 for rotation thereabout, has a series of peripheral teeth 98 in engagement with teeth 100 of rack 102. This rack 102 is reciprocably mounted for rectilinear movement in a cavity 104 formed in housing 66. A series of teeth 106 are formed on the inner face of driven gear 96 and are, like teeth 76, constantly in mesh with pinion 78. A notch 108 formed in the annular edge of driven gear 96 receives block 110 which is coupled to yoke 90 by a specially formed head 112. This head is T-shaped and the free ends of the cross arms 114 are attached to one end of springs 116, the other ends of which are fastened to bracket 118 that is freely mounted on shaft 52 and formed to present an overhanging portion that is extended over driven gear 96, disk 80 and into proximity to the annular periphery of driving gear 72, as seen in Fig. 5. This overhanging portion of bracket 118 is secured to driving gear 72 through the medium of machine bolts 120.

Head 112 is pivotally secured to block 110 by pin 122. The upper end of head 112 extends through slot 124 provided in yoke 90. Rollers 126 are mounted upon head 112 for engagement with the inner surfaces of yoke 90.

Figure 6:
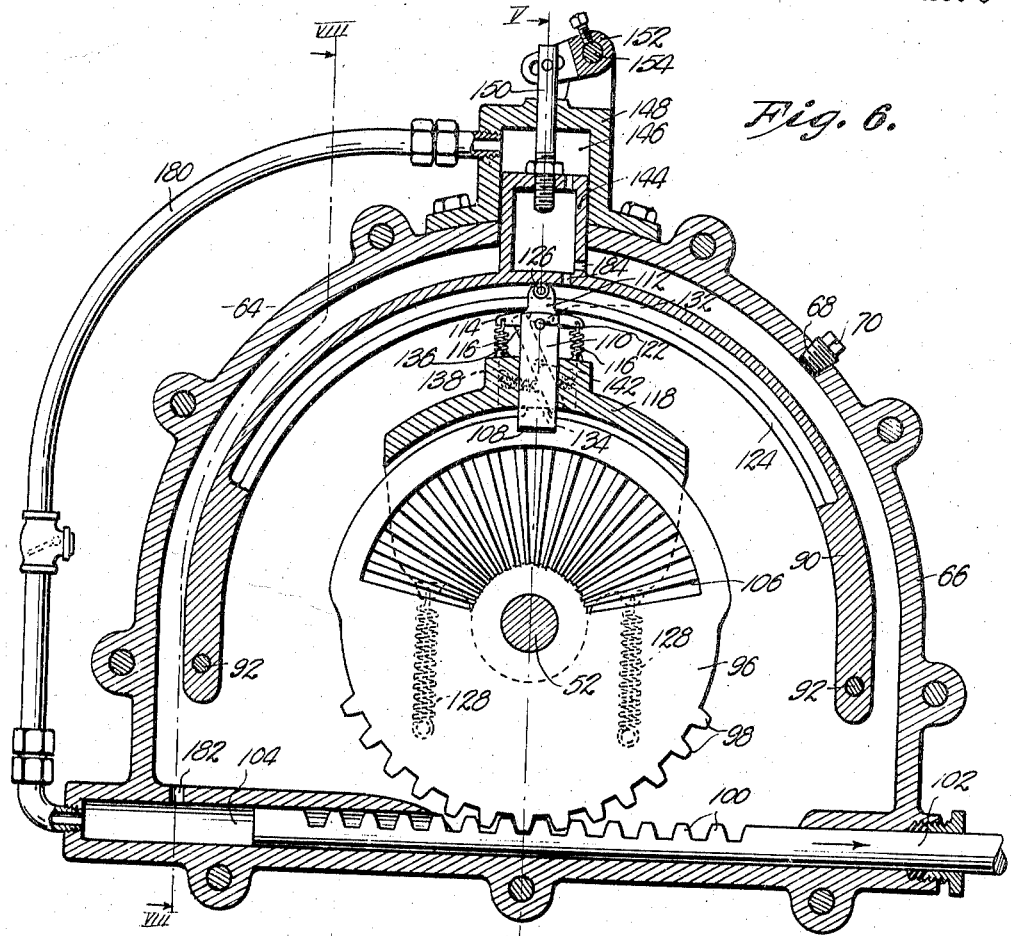
Fig. 6 is a sectional view through the transmission taken on line VI—VI of Fig. 5.

Bracket 118 is yieldably held in the position shown in Fig. 6 by counter-balancing springs 128, one of which is on each side of shaft 52. One end of each spring 128 is fastened to the lower edge of bracket 118, while the other ends of said springs are secured to driven gear 96 through the use of bolts 130. Block 110 has a laterally extending ear 132 which overhangs the radially projecting boss 134 integral with driven gear 96. A locking bar 136 pivotally secured to bracket 118 lies between ear 132 and boss 134, and is urged into a vertical position between said ear 132 and the boss 134 by springs 138. There are two of these springs 138 positioned in a cavity 140 formed in the overhanging portion of bracket 118; a spring 138 on each side of member 142, which pivotally supports locking bar 132.

Yoke 90 has a polygonal, hollow head 144 that fits into socket 146 of cap 148 carried on the outer face of housing 66. Stem 150 journalled in cap 148 is attached to head 144 and the projected end of stem 150 passes between the bifurcated portion of arm 152 that is mounted on shaft 154.

A crank 156 carried by one end of shaft 154 receives one end of rod 158 that is reciprocably carried by collars 160 on steering column 42. A foot pedal 162 is slidably mounted on steering column 42 and is attached to rod 158 so that the operator may manipulate the rod through the use of feet as well as through the employment of specially constructed parts on steering wheel 44.

The rim of this steering wheel 44 has sections 164 therein that are rotatable about a shaft 166. Plates 168 at the ends of sections 164 provide adequate bearings to journal shafts 166 and to receive the inturned ends 170 of rods 172 that extend inwardly toward steering column 42 where the same are operably connected to lever 174 mounted for movement about the axis of pin 176.

Rollers 178 carried by lever 174 to one side of pin 176 engage the annular flange of the upper collar 160 to which rod 158 is secured. A tube 180 is in communication with cavity 146 in cap 148 and is in communication with cavity 104 wherein rack 102 reciprocates. Ports 182 formed in housing 66 and 184 formed in head 144 cooperate with tube 180 in maintaining an equalized oil supply around all of the parts of transmission 64.

*Operation*

When the parts of the steering mechanism are set as above described and illustrated in the drawings, a movement of steering wheel 44 which transmits rotary motion to shaft 52, will result in moving wheels 18 about the axes thereof in one direction, and the movement of wheels 22 will be about their axes in the same direction. As an example, when steering wheel 44 is moved clockwise, wheels 18 will move toward the position shown in dotted lines of Fig. 1, from the position shown in full lines thereof. Wheels 22 will simultaneously move toward the position shown in dotted lines from the position shown in full lines of Fig. 1, and the parts contributing to such a shifting of wheels 18 and 22 respectively, will be actuated by the rotation of shaft 52. Such turning of steering wheel 44 will move arm 50 so that link 54 will draw arms 48 about the axes of rotation 20. Obviously, tie-rod 46 will carry the force from the lefthand arm to the one associated with the wheel on the right. Movement of rear wheels 22 is caused by forcing rack 102 in the direction of the arrow, shown in Fig. 6.

When the parts are in the relation shown in Figs. 5 and 6, driving gear 72, disk 80, driven gear 96 and bracket 118 are all interlocked for movement about the axis of shaft 52 when it is rotated by the manipulation of steering wheel 44, thus, when all of these said parts are driven about the axis of shaft 52, rack 102 will be moved as just above set down. Rod 62 will be drawn forwardly, bell-crank lever 58 will move about its pivotal connection 186, and link 60 will then be forced in the direction of the arrow, shown in Fig. 3, so as to turn section 32 of case 30. Associated wheel 22 will therefore, be moved toward the position shown in dotted lines of Fig. 1.

When it is desirable to cause rear wheels 22 to be turned about their axes in the opposite direction as the movement of wheels 18, the driver rotates section 164 of steering wheel 44 a sufficient amount to turn lever 174 about pin 176 and thereby move collar 160 upward toward steering wheel 44. Such movement will draw rod 158 to a position where shaft 154 is rotated a sufficient amount to lift stem 150 to a point where yoke 90 will draw the teeth 86 of jaws 84 into engagement with teeth 82 of disk 80. Disk 80, therefore, is locked against movement about shaft 52. Simultaneously, block 110 is lifted from notch 108 because head 112 is lifted by yoke 90 as soon as block 110 is lifted from notch 108. Locking bar 136 is forced between gear 132 and boss 134 to hold driven gear 96 and block 110 out of engagement. Springs 138 perform the function of moving locking bar 132 to the vertical position between the parts just mentioned.

After yoke 90 has been lifted by the driver through the manipulation of sections 164 and through the operation of the parts as just set down, a movement of steering wheel 44 in a clockwise direction, for example, will turn wheels 18 toward the position shown in dotted lines of Fig. 1 in precisely the same manner as above set forth. The rear wheels 22, however, will move toward the position shown in the dot and dash lines, from the full line position, or about their axes in a direction opposite the direction of travel of front wheels 18.

Such movement of wheels 22 will positively occur because when driving gear 72 is rotated by shaft 52, pinion 78 will move driven gear 96 in a direction opposite to the direction of rotation of shaft 52. This because disk 80 which supports pinion 78, cannot move about the axis of shaft 52 in view of jaws 84 and their holding action. With block 110 removed from the notch 108 of driven gear 96, pinion 78 will rotate driven gear 96 so as to draw rack 102 in a direction opposite to that indicated by the arrow in Fig. 6, and therefore wheels 22 will be moved about the axes of pins 36 as just described.

As driven gear 96 is moved, locking bar 136 will no longer be between ear 132 and boss 134, and when the wheels are again brought into alignment, locking bar 136 will be inclined as shown in Fig. 6. Manifestly, sections 164 must be returned to their normal position before it is again possible to normally operate the steering mechanism so that wheels 18 and 22 of the front and rear pairs move about their axes in the same direction. Balancing springs 128 exert their forces to maintain driven gear 96, bracket 118, and the parts associated therewith, in positions where the wheels are in alignment.

It is obvious to one skilled in the art that advantages arising from the ability to so manipulate the front and rear wheels of a vehicle in the manner made clear herein, are many and since it is possible to construct steering mechanism having physical characteristics other than that illustrated in the drawings, it is desired to be limited only by the spirit of the invention and scope of the appended claims.

Having thus described the invention, what is claimed as new and desired to be secured by Letters Patent is:

1. In an automobile having a pair of guide wheels and a pair of driven wheels, means for mounting each of said wheels respectively for movement about a vertical axis, and a steering wheel having a segmental rim, certain of which segments are rotatable about their respective axes, the combination of structure, operable by manual manipulation of said steering wheel for turning all of said wheels about the axes thereof, said structure comprising a steering power transmission including a pair of gears; a shaft supporting said gears for rotation, and a pinion in mesh with both gears of said pair; structure joining said transmission with each of said wheels; and means connecting the transmission to the steering wheel, said steering power transmission adapted to normally cause the wheels of one pair to turn about their axes in directions the same as the direction of rotation of the wheels of the other pair, said transmission having manually settable parts including a shiftable member for selectively interlocking said gears for simultaneous or individual rotation for selectively causing the wheels of one of said pairs to reverse their direction of travel from said normal; and elements interconnecting the shiftable member and the rotatable segments of the steering wheel.

2. In an automobile having two pairs of wheels, means for mounting each of said wheels respectively for movement about a vertical axis, a steering wheel, and a steering column, the combination of a transmission comprising a shaft rotatable by the steering column; a driving gear secured to the shaft; a driven gear loosely mounted on said shaft; a pinion in mesh with the driving gear and said driven gear; an arm attached to the shaft for movement therewith; structure joining said arm and the wheels of one of said pairs; a rack operable by one of the gears; and structure joining said rack and the wheels of the other of said pairs of wheels.

3. In an automobile having two pairs of wheels, means for mounting each of said wheels respectively for movement about a vertical axis, a steering wheel, and a steering column, the combination of a transmission comprising a shaft rotatable by the steering column; a driving gear secured to the shaft; a driven gear loosely mounted on said shaft; a pinion in mesh with the driving gear and said driven gear; an arm attached to the shaft for movement therewith; structure joining said arm and the wheels of one of said pairs; a rack operable by one of the gears; and structure joining said rack and the wheels of the other of said pairs of wheels; and means for interlocking said gears to cause the same to simultaneously rotate about the axis of said shaft when the same is rotated by the steering column.

4. In an automobile having two pairs of wheels, means for mounting each of said wheels respectively for movement about a vertical axis, a steering wheel, and a steering column, the combination of a transmission comprising a shaft rotatable by the steering column; a driving gear secured to the shaft; a driven gear loosely mounted on said shaft; a pinion in mesh with the driving gear and said driven gear; an arm attached to the shaft for movement therewith; structure joining said arm and the wheels of one of said pairs; a rack operable by the driven gear; structure joining said rack and the wheels of the other of said pairs of wheels; and means for interlocking said gears to cause the same to simultaneously rotate about the axis of said shaft when the same is rotated by the steering post, said interlocking means having structure operable from a point on the steering wheel for selectively releasing the interlocking means to cause the pinion to move the driven gear in a direction of rotation opposite to the direction of rotation of the driving gear whereby to reverse the direction of rotation of the said other pair of wheels about their axes from that direction travelled when the interlocking means is in the operative position.

5. In an automobile having two pairs of wheels, means for mounting each of said wheels respectively for movement about a vertical axis, a steering wheel, and a steering column, the combination of a transmission comprising a shaft rotatable by the steering column; a driving gear secured to the shaft; a driven gear loosely mounted on said shaft; a pinion in mesh with the driving gear and said driven gear; an arm attached to the shaft for movement therewith; structure joining said arm and the wheels of one of said pairs; a rack operable by the driven gear; structure joining said rack and the wheels of the other of said pairs of wheels; and means for interlocking said gears to cause the same to simultaneously rotate about the axis of said shaft when the same is rotated by the steering post, said interlocking means having structure operable from a point on the steering wheel for selectively releasing the interlocking means to cause the pinion to move the driven gear in a direction of rotation opposite to the direction of rotation of the driving gear whereby to reverse the direction of rotation of the said other pair of wheels about their axes from that direction travelled when the interlocking means is in the operative position, said interlocking means including a disc carrying said pinion, said interlocking means having elements for securing the pinion against such rotation about the axis of the shaft when the interlocking means is moved to the inoperative position.

WILBERT PAUL BERRY.